F. W. HUDSON.
GATE VALVE.
APPLICATION FILED SEPT. 18, 1912.
1,159,677.
Patented Nov. 9, 1915.
2 SHEETS—SHEET 2.
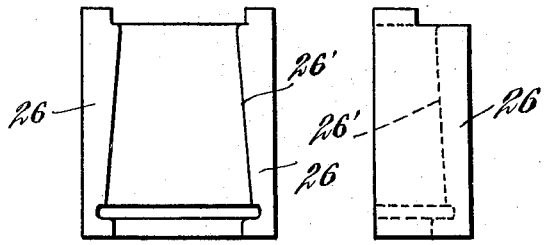
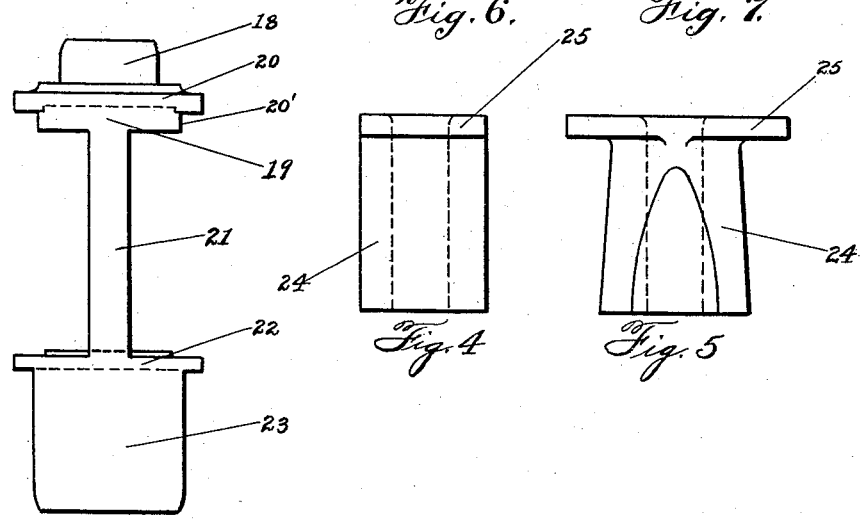
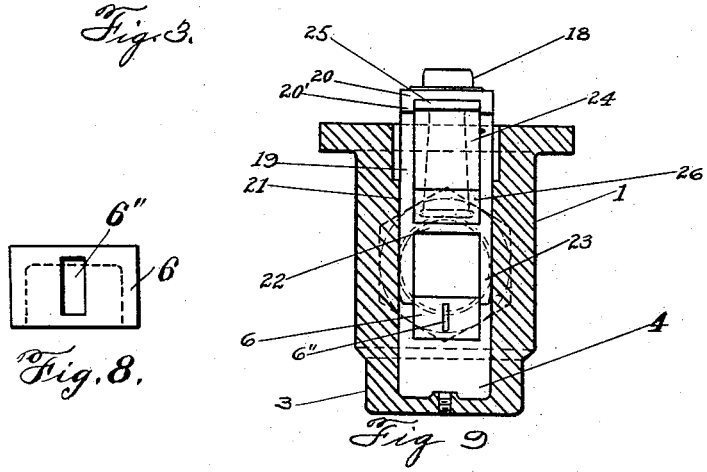
WITNESSES:
INVENTOR.
FRANK W. HUDSON.
BY
ATTORNEY.

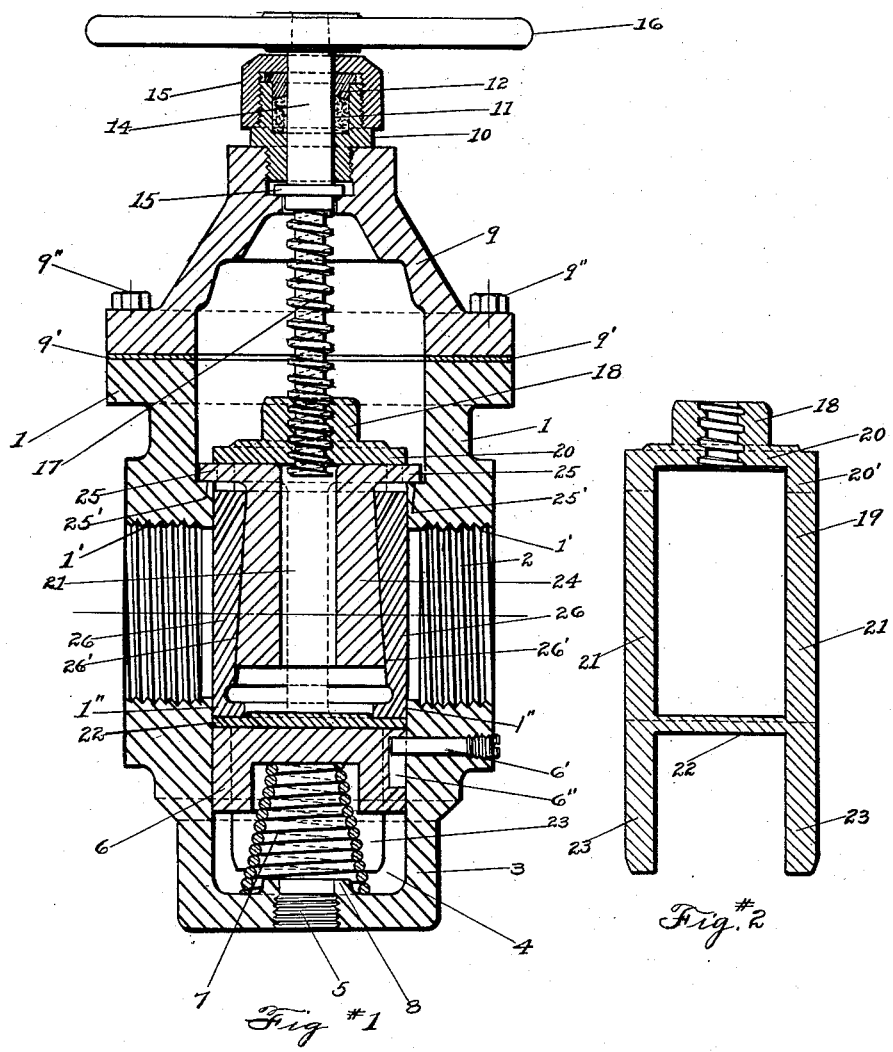

UNITED STATES PATENT OFFICE.

FRANK W. HUDSON, OF SHARON, PENNSYLVANIA, ASSIGNOR, BY DIRECT AND MESNE ASSIGNMENTS, TO HORACE W. DAVIS, OF SHARON, PENNSYLVANIA.

GATE-VALVE.

1,159,677.  Specification of Letters Patent.  Patented Nov. 9, 1915.

Application filed September 18, 1912.  Serial No. 721,066.

*To all whom it may concern:*

Be it known that I, FRANK W. HUDSON, citizen of the United States, residing at Sharon, in the county of Mercer and State of Pennsylvania, have invented certain new and useful Improvements in Gate-Valves, of which the following is a specification.

This invention relates to valves of the type known as gate valves.

One of the objects of my invention is the provision of such a valve with seats which, while the valve is open, are protected from the action of the fluid passing through the valve.

Another object is to obtain a valve of this type which, when opened, affords a smooth rectangular passage without recesses whereby the valve cannot be clogged with dirt or other foreign matter carried by the fluid passing through it.

A still further object lies in accomplishing the foregoing ends, and at the same time providing a valve of comparatively few parts and of simple construction and which combines with a low cost of manufacture a minimum of operating parts.

Still further objects and purposes of my invention will appear from an inspection of the drawings, the specification describing the same, and the claims appended thereto in which are set forth the combination of elements, arrangement of parts and novel structural details properly comprised within the scope of the same.

In the drawings, in which is illustrated one of the possible embodiments of my invention, Figure 1 is a side cross sectional elevation of my gate valve, when closed, showing the lower seat protector depressed, the cage abutting thereon, and the side gates expanded against the seats. Fig. 2 is a front sectional elevation of the gate cage. Fig. 3 is a side view of the gate cage. Fig. 4 is an end view of the wedge. Fig. 5 is a front view of the same member. Figs. 6 and 7 are rear and side views respectively of a gate member. Fig. 8 is an end view of the bottom seat protector showing the slot therein. Fig. 9 is a reduced diagrammatic view and side elevation of the valve body, showing in outline the position of the cage, wedge and gates and the shape of the passage when the valve is opened.

Referring now to the several figures in which like reference characters designate like parts, (1) represents the valve body proper provided with threaded openings (2) in which the pipes are adapted to connect.

(3) is the bottom extension providing a recess for the reception of the bottom gate protector and the coöperating elements. This bottom extension (3) has an inner cavity (4) provided with a removable plug (5) which may be used for cleaning purposes. This plug enters through a boss (8) which affords a seat for the spiral spring (7), which when the valve is opened raises the protector (6) to its normal position. This seat protector (6) as seen by inspection of Figs. 1 and 8, is rectangular in form and provided with the slot (6″) at one side, into which the seat stop 6′ projects, thereby limiting the vertical movement of the protector (6). The valve bonnet (9) rests upon a packing (9′) and is secured to the valve body by bolts or other suitable means (9″). Threaded into the upper end of this is the stuffing box (10) and therein the packing (11), held in place by the gland (12) and surrounded by the gland nut (13).

The valve, which in the present form is that of the non-rising stem variety is provided with the stem (14) and a collar (15) mounted for rotative movement between the stuffing box (10) and bonnet (9). The upper part of the stem is provided with a hand wheel (16). Below the collar, the stem is threaded as at 17, this thread having engagement with the female threaded upper portion (18) of the gate cage (19). As is more clearly shown in Figs. 2 and 3, this gate cage, which is an integral casting, comprises the top (20) recessed in front and rear at 20′. Extending down on either side are legs (21) connecting the top with the bottom member (22). The bottom member is provided on either side with a lateral extension, the inner sides of which, together with the bottom of the member (22), comprise three sides of the rectangular fluid passage. The wedge (24) as more clearly shown in Figs. 4 and 5, has its sides sloping outwardly toward the bottom and at the top is provided with outwardly extending flanges (25). These flanges are adapted to contact with the shoulders (25′) and the valve body proper when the valve is closed, thereby preventing further downward movement of the wedge.

The upper and lower seats for the gate are designated by the characters (1') and (1''). The gates (26) as shown more clearly in Figs. 6 and 7 comprise two members having their outer surfaces parti-cylindrical in shape. The inner part of each gate is downwardly tapering in form, the gates being inclined at the same angle as that of the sides of the wedge. As appears in Fig. 1, these gates, which are carried by the cage, have a limited vertical movement within the cage as does also the wedge (24).

In use, my valve operates as follows:— Starting with it in open position in which a smooth, rectangular passage is presented, as shown in Fig. 9, the hand wheel is turned in a clock wise direction, the stem being thereby rotated. The cage is then pressed downwardly, carrying with it the hollow wedge and gate members. When the bottom of the cage abuts against the bottom seat protector, it is moved downwardly against the tension of the spring (7) until stopped by the stop (6'). At the same time the wedge flanges (25) have come in contact with the shoulders (25') and are prevented from further downward movement while the continued rotation of the stem forces downwardly the cage, carrying with it the gates which have at this time closed the fluid passage. When the flanges (25) abut against the shoulders (25') the tapered surface of the wedge acting upon the reverse tapering of the gates, separating them, thus locking them against the seats (1') and (1''). In reversing the rotation of the hand wheel, the valve is again opened, the operation of the parts reversing. The cage first moves upwardly and the wedge flanges (25) remain against the shoulders (25') until the under part of the flanges rests on the upper portion of the gate members. The gates are thus allowed to move slightly inwardly, thus loosening the contact between the gates and the seat. The cage continues upwardly carrying with it the wedge and gates, while the seat protector (6) relieved of the pressure of the gate bottom (22) moves until limited by the stop (6') so that the top of the protector (6) is flush with the seats (1'). When the cage has reached its maximum height, the gates are above the upper seats (1') and a rectangular passage is presented, this passage comprising the bottom (22) and lateral extensions (23) of the cage and the top of the seat protector (6).

It will be noted from the foregoing construction that no foreign substance in passing through the valve has lodgment afforded to it either at the sides or the bottom of the opening. The lateral extensions of the cage completely occupy the space into which the gates in ordinary valves fit for the purpose of giving a tight closure. Also that portion of the valve body comprising the seats against which the gates lock is, while the valve is opened, protected by the cage and lower seat protector.

I have found it desirable to embody the general idea in this valve in valves of other specific design. In a valve known as the flat type, a rectangular cage may be employed. In such a type the same principle is applied by using flat gates having projections on their inner sides against which a short bar, the equivalent of the present wedge, passing through the sides of the gate, abuts against suitable shoulders and the projections coming down upon the bar in like manner spread apart the gate. In the latter form, as well as other adaptations, I employ the lateral extensions of the cage which, coöperating with the lower seat protector, afford an unobstructed flue or passage and sure protection to the gate seats.

I claim:—

1. A gate valve having in combination a cage, gates carried by said cage, a movable seat protector in the bottom of the valve, and lateral extensions on said cage extending below said seat protector.

2. A gate valve having in combination a cage, gates carried by said cage, a seat protector, said cage and seat protector having longitudinal movement within the valve, said seat protector being depressed by contact of the bottom of the cage with it, and lateral extensions on said cage extending below the top of said seat protector in any position of the cage.

3. A gate valve having in combination a cage mounted for longitudinal movement therein, a seat protector having limited longitudinal movement in the bottom of said valve, lateral members extending downwardly from the bottom of said cage to a point below the top of the seat protector in any position of the cage, the inner surfaces of said members being parallel and flush with the inlet passage of the valve, and gates carried by the cage and adapted, when the latter travels in one direction, to move upwardly and close the valve.

4. In a gate valve, a seat protector having a flat top, a closing member, having gates thereon, having its bottom parallel with said top and parallel lateral extensions extending from said closing member to a point below the top of the protector.

5. A gate valve having metal seats, a seat protector, closing members movably mounted therein, lateral extensions extending from the closing member to a point below the protector, the top of said protector, bottom of said closing member and adjacent sides of said extensions presenting a flat surfaced rectangular fluid passage in any open adjustment of the valve, a means whereby the closing members are locked against the metal seats.

6. In a gate valve, the combination of a valve body, seats therein, shoulders above the seats, a cage having longitudinal movement within the valve, gates carried by the cage and means having limited movement within said cage and adapted, upon coming in contact with the shoulders, to press said gates against the seats.

7. A gate valve having in combination a movable bottom seat protector, a movable cage coöperating therewith to depress it, gates carried by said cage and a member having a limited movement within the cage and adapted to move up relatively to the cage and spread the gates as the protector is depressed.

8. A gate valve having a plurality of seats therein, expanding gates, and movable members registering flush with each of said seats when the valve is opened.

9. A gate valve having rectangular seats therein, gates coacting with said seats to close the valve, and members moving into a flush position with the whole of said seats when the valve is opened.

10. A gate valve having seats therein, a cage, gates carried by said cage, and members adapted to move upwardly with said cage and contact with that portion of each seat vacated by the cage.

FRANK W. HUDSON.

Witnesses:
FRED T. FRUIT,
EUGENE E. ANDERSON.

Copies of this patent may be obtained for five cents each, by addressing the "Commissioner of Patents, Washington, D. C."